United States Patent [19]

Godfrey

[11] 4,127,619

[45] Nov. 28, 1978

[54] POLYETHYLENE CONTAINING HOT MELT ADHESIVES

[75] Inventor: Darryl A. Godfrey, Longview, Tex.

[73] Assignee: Eastman Kodak Company, Rochester, N.Y.

[21] Appl. No.: 822,186

[22] Filed: Aug. 5, 1977

[51] Int. Cl.² .............................................. C08L 9/00
[52] U.S. Cl. ................................. 260/889; 260/27 R; 260/27 BB; 260/28.5 A; 260/28.5 B; 260/45.75 W; 260/45.85 B; 260/45.85 H; 260/45.95 R; 260/897 A
[58] Field of Search ............. 260/27 R, 27 BB, 28.5 A, 260/28.5 B, 897 A, 889

[56] References Cited

U.S. PATENT DOCUMENTS

| | | | |
|---|---|---|---|
| 3,700,758 | 10/1972 | Johnson, Jr. et al. | 260/897 A |
| 3,794,698 | 2/1974 | Diaz et al. | 260/897 A |
| 3,976,612 | 8/1976 | Kaji et al. | 260/28.5 A |
| 4,049,602 | 9/1977 | Albers et al. | 260/27 R |

*Primary Examiner*—Melvyn I. Marquis
*Attorney, Agent, or Firm*—Clyde L. Tootle; Daniel B. Reece, III

[57] ABSTRACT

The hot melt adhesives of the present invention comprise a blend of at least one polyethylene, a tackifying resin, and a high density, low viscosity polyethylene wax having a molecular weight of about 1000. This hot melt adhesive has a novel combination of properties including excellent elevated temperature properties.

8 Claims, No Drawings

POLYETHYLENE CONTAINING HOT MELT ADHESIVES

This invention relates to polyethylene containing hot melt adhesives. One aspect of this invention concerns a polyethylene containing hot melt adhesive having a novel combination of properties. Another aspect of this invention concerns a polyethylene containing hot melt adhesive that has good adhesive properties including excellent elevated temperature properties.

Hot melt adhesives are widely used in industry for various applications such as in product assembly. For example, one such application is in the packaging industry in the fabrication of corrugated paperboard and also for use in cardboard case sealing and carton closing operations. The adhesive is generally applied by a hot melt applicator which consists of a reservoir for the adhesive, heating means for melting the adhesive and maintaining it in a molten state, and means for applying the adhesive for a particular end use.

The rate at which the adhesive can be applied is primarily a function of the melt viscosity of the adhesive, i.e., the lower the viscosity the faster the rate of application. In order to increase production rates it has been in the past necessary to operate at higher temperatures to reduce the melt viscosity of the adhesive. This often degrades the adhesive which is undesirable. The melt viscosity of polyolefin-based hot-melt adhesives is generally higher when compared with ethylene-vinyl acetate copolymer based hot melt adhesives. Therefore, this has been one of the major problems in the use of polyolefin based hot melt adhesives in competing with other types of hot melt adhesives. Attempts have been made to correct this problem by lowering the melt viscosity of the polyolefin based hot melt adhesive. However, lowering the molecular weight of a polyolefin, such as polyethylene, lowers the melt viscosity, but it also substantially reduces the bond strength of an adhesive made from such polyethylene.

Also, polyethylene-based hot melt adhesives generally have a longer hot tack time (i.e., 2–4 seconds) than similar ethylene-vinyl acetate copolymer based adhesives (i.e., about 1 second). This relatively long hot tack time is a disadvantage for use at fast line speeds. For example, a polyethylene based adhesive used in sealing cartons at a rate of 22 per minute may not be satisfactory at speeds of 44 per minute. Since the packaging industry is continually increasing the speed of operation of their case and carton sealing operations it would be an advance in the state of the art to provide a hot melt polyethylene containing adhesive having the necessary melt viscosity and tack time to be useful in rapid bonding or sealing operations.

It is, therefore, an object of the present invention to provide a novel hot melt adhesive.

Another object of this invention is to provide a hot melt adhesive that has a good balance of properties including both low melt viscosity and short hot tack time.

A further object of the present invention is to provide a polyethylene containing hot melt adhesive which can be used in rapid sealing and bonding operations.

Another and further object of this invention is to provide an adhesive having good adhesion properties which can be applied without the use of a solvent.

In accordance with the present invention we have found that a blend comprising at least one polyethylene, a tackifying resin, and a high density, low viscosity polyethylene wax having a molecular weight of about 1000, provides a hot melt adhesive which can be applied without solvents and has a novel combination of properties including low melt viscosity properties and short hot tack time.

The polyethylenes can be any of the normally solid polyethylenes having a melt viscosity of 500 to 20,000 centipoise at 190° C., preferably 1000 to 6000, and a density greater than 0.90 to about 0.97 g./cc. The polyethylenes are prepared by processes well known in the art. For example, polyethylenes with densities up to about 0.945 are prepared by polymerizing ethylene at pressures greater than 500 atmospheres in the presence of peroxide catalysts. Higher density polyethylenes are prepared, for example, in lower pressure processes with the use of Ziegler and Phillips type catalysts. Blends of polyethylenes prepared by the same or different processes can be used.

The polyethylenes can also be modified polyethylenes having saponification numbers of about 3 to 60 prepared by reacting polyethylene with an unsaturated polycarboxylic acid, anhydride or ester thereof by processes also well known in the art, as for example, U.S. Pat. No. 3,856,889. The polyethylene reacted with this unsaturated component can be low molecular weight or degraded polyethylene. The modified polyethylene alone can be used as the polyethylene component or blends of such modified polyethylene with unmodified polyethylene or blends of modified polyethylene and blends of more than one unmodified polyethylene can also be used.

The tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, synthetic polyterpenes, rosin esters and the like. One such suitable hydrocarbon tackifying resin is a hydrocarbon resin having a softening point of 130° C. and available commercially as Eastman Resin H-130 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and a ball softening point of from about 80° to 125° C.; an acid number of from about 0 to 2; a saponification value of less than about 1; and an iodine value of from about 75–100. Examples of such commercially available resins of this type are "Wingtack 95" as sold by the Goodyear Tire and Rubber Co. and the Sta-Tac and Betaprene H resins sold by the Reichhold Chemical Corp.

Also suitable resins are the terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, terpinene, terpinolene, limonene, terpentine, a terpene cut or fraction, and various other terpenes. Particularly useful starting materials are terpene mixtures containing at least 20% β-pinene and/or limonene or dipentene (racemic limonene), and the "sulfate turpentine" obtained as a by-product in the sulfate pulping process.

The hydrocarbon resins and polyterpene tackifying resins can be used either alone or in combination. These tackifying resins can be used in amounts of about 10 percent to about 40 percent by weight of the adhesive composition, preferably about 20 percent to about 30 percent by weight.

The high density, low viscosity polyethylene waxes useful in this invention are widely available articles of commerce and can be prepared by known techniques. These waxes are made by degrading high density polyethylene to the desired viscosity. Polyethylene waxes normally have, and should have for the present invention, Ring and Ball softening points in the range of 110° to 120° C. and preferably in the range of 113° to 117° C. The wax has a molecular weight of about 800 to 1200, preferably about 1000, a penetration hardness at 23° C. of about 1.0, and a melt viscosity preferably of about 25 cp. at 150° C. Such waxes are sold under various trade names such as Bareco 1000 polywax, sold by Petrolite Corporation. The polyethylene wax can be used in amounts of about 7 to 15% by weight of the adhesive composition, preferably about 10 percent by weight.

These high density, low viscosity polyethylene waxes provide adhesive compositions which have superior high temperature blend strengths from that provided by adhesive blends without the high density waxes, or with blends which contain other comparable commercially available aliphatic hydrocarbon waxes.

The adhesive compositions of this invention are prepared by blending together the adhesive components in the melt at a temperature of about 160° C. to about 200° C. until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions. Solvents such as hexane, heptane, mineral spirits, xylene, toluene, benzene, chlorinated hydrocarbons, etc., are not needed to prepare the compositions of this invention; however, they can be used if desired.

In addition to the adhesive components, it is desirable for the adhesive compositions to contain about 0.1 percent to about 1.5 percent by weight, preferably about 0.25 percent to 1.0 percent by weight, of one or more antioxidants. Antioxidants that are effective include, for example, tris(di-t-butyl-p-hydroxybenzyl)-trimethylbenzene (Ionox 330), alkylated bisphenol (Naugawhite), zinc dibutyl dithiocarbamate (Butyl Zimate), and 4,4'-methylene bis(2,6-di-tert-butylphenol) (Ethyl 702), tetrakis[methylene-3-(3',5'-di-t-butyl-4-hydroxyphenyl)-propionate]methane (Irganox 1010), lauryl stearyl thiodipropionate (Plastanox 1212), and dilauryl 3,3'-thiodipropionate (Plastanox DLTDP sold by American Cyanamid) and 2,6-di-tert-butyl-p-cresol (BHT) and the like.

Additives such as nucleating agents, pigments, colorants, fillers, solvents, and the like can also be added to the adhesive compositions of the present invention.

The adhesive compositions of this invention, which are essentially 100 percent solids, have a Thermosel viscosity, Model RVT, in the range of 750 to 100,000 centipoise at 177° C. and DSC melting points of at least about 90° C.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Low-molecular weight polyethylene (210 g.) having a melt viscosity of 3075 cp. at 177° C., density of 0.906 g./cc., and ring and ball softening point of 105° C., 89.4 grams of Eastman Resin H-130 hydrocarbon resin tackifier having a density of 1.028 g./cc. at 70° F., melt viscosity of 2150 cp. at 177° C., and ring and ball softening point of 129° C., and 0.6 gram of tetrakis[methylene-3-(3',5'-di-t-butyl-4-hydroxyphenyl)propionate]methane, are placed in a 500 ml. round bottom resin pot fitted with a mechanical stirrer and nitrogen purge line. The system is purged with nitrogen and heated to 200° C. using a metal bath. The polymer blend is stirred for one hour after melting to insure that the blend is homogeneous. The molten polymer blend is poured in the form of a thin cake, cooled and chopped into small pieces for use as an adhesive. This composition has a melt viscosity of 2040 cp. at 177° C. The adhesive properties of this material are tested in the following manner using corrugated board and an adhesive tester that simulates a case sealing line.

Corrugated board specimens 6.5 in. long by 2.5 in. wide are placed in the grips of the tester. The bottom specimen is cut so that the flutes are parallel to the adhesive bead with the unglazed side being bonded. All top specimens have the flutes perpendicular to the bead with the machine-glazed side being bonded since this is the manner in which a box is bonded in actual practice. The bottom specimen is then moved forward at a constant speed under the melt applicator for the application of the adhesive bead and is stopped directly under the top specimen. After a predetermined open time, the top specimen is moved down to contact the lower specimen. Contact is maintained for a given compression time and force, after which the top substrate is separated from the bottom substrate using a constant force (40 psig.). The separation force required is measured by a pressure-transducer and recorded on a digital peak load meter. The adhesive bead width (before compression) is adjusted by nitrogen pressure on the hot-melt adhesive applicator to give a width of 70 mils. Ten tests are carried out at each compression time under the following conditions:

| Open time | 0.75 sec. |
|---|---|
| Down pressure | 16.5 psig. |
| Up pressure | 40.0 psig. |
| Compression times of 0.75 | 4.0 seconds. |

The bond separation force is measured in pounds to separate a bond having a constant length of 6.5 in. The percent fiber tear is determined as the fraction of the bond length showing fiber tear. The hot tack time (defined as the compression time required to give a bond separation force of 30 lb.) of this adhesive is 1.9 sec. After a compression time of 4.0 sec., 60% of the bond shows fiber tear.

EXAMPLE 2

One-hundred eighty-six and seven-tenths grams of the polyethylene used in Example 1 and 79.4 grams of Eastman Resin H-130 hydrocarbon resin tackifier, 33.3 grams of Bareco 1000 polywax having a melting point of 94°–99° C. and a melt viscosity of 4.2 cp. at 177° C., and 0.6 gram of tetrakis[methylene-3-(3',5'-di-t-butyl-4-hydroxyphenyl)propionate]methane are blended and tested as an adhesive for bonding corrugated board using the procedures described in Example 1. The blend has a melt viscosity of 177° C. of 1150 cp. The addition of the Bareco 1000 polywax provides a significant increase in the Tc of the blend and concurrently reduces the melt viscosity from 2040 to 1159 cp. at 177° C. and causes a significant increase in bond separation force especially at the short compression times as shown by a hot tack time of 1.2 sec. Furthermore, the addition of the Bareco 1000 polywax causes a significant increase in the amount of fiber tear obtained in the bonds at compression times of 3.0 sec. or less.

Similarly good results are obtained when 0.35% dilauryl thiodipropionate and 0.1% tetrakis[methylene-3-(3',5'-di-t-butyl-4-hydroxyphenyl)propionate]methane are used as the stabilization system.

EXAMPLE 3

Low-molecular weight maleated polyethylene (210 g.) having a saponification number of 5, a melt viscosity of 3350 cp. at 190° C., ring and ball softening point of 106° C., and a density of 0.908 g./cc., 89.4 grams of Eastman Resin H-130 hydrocarbon resin tackifier having a density of 1.028 g./cc. at 70° F., melt viscosity of 2150 cp. at 177° C., and ring and ball softening point of 129° C., and 0.6 gram of tetrakis[methylene-3-(3',5'-di-t-butyl-4-hydroxyphenyl)propionate]methane are blended according to the procedure described in Example 1. This adhesive provides a hot tack time of 1.75 sec. and 100% fiber tear after a compression time of 4 sec.

EXAMPLE 4

Low-molecular weight maleated polyethylene (186.7 g.) having a saponification number of 5, a melt viscosity of 3350 cp. at 190° C., ring and ball osftening point of 106° C., and a density of 0.908 g./cc., 78.65 grams of Eastman Resin H-130 hydrocarbon resin tackifier having a density of 1.028 g./cc. at 70° F., melt viscosity of 2150 cp. at 177° C., and ring and ball softening point of 129° C., 33.3 grams of Bareco 1000 polywax having a melting point of 94°-99° C., 1.05 grams of lauryl stearyl ester of thiodipropionic acid, and 0.30 gram of tetrakis[methylene-3-(3',5'-di-t-butyl-4-hydroxyphenyl)propionate]methane are blended according to the procedure of Example 1. The addition of the Bareco 1000 polywax to this composition reduced the melt viscosity from 1860 to 1050 cp. at 177° C. The effect of the addition of the Bareco 1000 polywax and the maleated polyethylene on bond separation force is reflected in the very short hot tack time of 0.85 sec. obtained with this material. The percent fiber tear obtained is significantly higher than that obtained with the compositions described in Examples 1 or 3, even at a compression time of 0.75 sec.

EXAMPLE 5

Low-molecular weight polyethylene (150 grams) having a melt viscosity of 3075 cp. at 190° C., density of 0.906 g./cc. and ring and ball softening point of 104° C., 30.0 grams of a low-molecular weight maleated polyethylene having a saponification number of 5, a melt viscosity of 3350 cp. at 190° C., ring and ball softening point of 106° C., and a density of 0.908 g./cc., 30.0 grams of Bareco 1000 polywax having a melting point of 94°-99° C., and a melt viscosity of 4.2 cp. at 177° C., 88.65 grams of Eastman Resin H-130 hydrocarbon resin tackifier having a density of 1.028 g./cc. at 70° F., melt viscosity of 2150 at 177° C., and ring and ball softening point of 129° C., 1.05 grams of lauryl stearyl ester of thiodipropionic acid, and 0.30 grams of tetrakis[methylene-3-(3',5'-di-t-butyl-4-hydroxyphenyl)propionate]methane are blended according to the procedure of Example 1. This composition has a melt viscosity of 1170 cp. at 177° C. Although the concentration of maleated polyethylene is substantially reduced in this example compared to that of Example 4, the bond separation force and percent fiber tear obtained at short compression times is significantly higher than that obtained in a comparable composition (Example 2) which does not contain any maleated polyethylene.

The hot melt adhesives comprising a blend of at least one polyethylene, a tackifying resin, and a high density, low viscosity polyethylene wax provide adhesives having a unique combination of properties which meet the requirements necessary for use in rapid bonding or closing applications. These adhesives have the low viscosity necessary for use in high speed sealing machines and the adhesive has excellent bond strength when applied over a broad temperature range of from about 300° to 375° F. Such adhesives are especially useful in the packaging industry for use in cardboard carton sealing operations.

The invention has been described in detail with particular reference to certain preferred embodiments thereof, but it will be understood that variations and modifications can be effected within the spirit and scope of the invention.

I claim:
1. An adhesive composition capable of being used as a hot melt adhesive comprising a blend of
   (a) about 50 to 80 percent by weight of at least one polyethylene having a melt viscosity of 500 to 20,000 centipoise at 190° C. and a density greater than 0.90 to about 0.97 g/cc.,
   (b) about 13 to 35 percent by weight of at least one tackifier resin selected from the group consisting of hydrocarbon resin and polyterpene resin, and
   (c) about 7 to 15 percent by weight of a high density, low viscosity polyethylene wax having a molecular weight of about 800 to 1200 and a Ring and Ball softening point in the range of 110° to 120° C.

2. An adhesive composition according to claim 1 wherein said high density, low viscosity polyethylene wax has a melting point within the range of 85° C. to 120° C. and a molecular weight of about 1000.

3. An adhesive composition according to claim 2 wherein said adhesive has a viscosity of from about 750 to about 100,000 centipoise at 177° C.

4. An adhesive composition according to claim 3 wherein said hydrocarbon resin is DAC-B hydrocarbon resin.

5. An adhesive composition capable of being used as a hot melt adhesive comprising a blend of
   (a) about 62 weight percent of at least one polyethylene having a melt viscosity of 500 to 20,000 centipoise at 190° C. and a density greater than about 0.90 to 0.97 g/cc.,
   (b) about 27 weight percent of at least one tackifier resin selected from the group consisting of hydrocarbon resin and polyterpene resin, and
   (c) about 11 weight percent of a high density, low viscosity polyethylene wax having a molecular weight of about 800 to 1200 and a Ring and Ball softening point in the range of 110° to 120° C.

6. An adhesive composition according to claim 5 wherein said high density polyethylene wax has a melting point within the range of 85° C. to 120° C. which is product of the degradation of high density polyethylene.

7. An adhesive composition according to claim 6 wherein said polyethylene has a melt viscosity of from about 750 to about 100,000 centipoise at 177° C.

8. An adhesive composition according to claim 7 wherein said hydrocarbon resin is DAC-B hydrocarbon resin.

* * * * *